Figure 4:
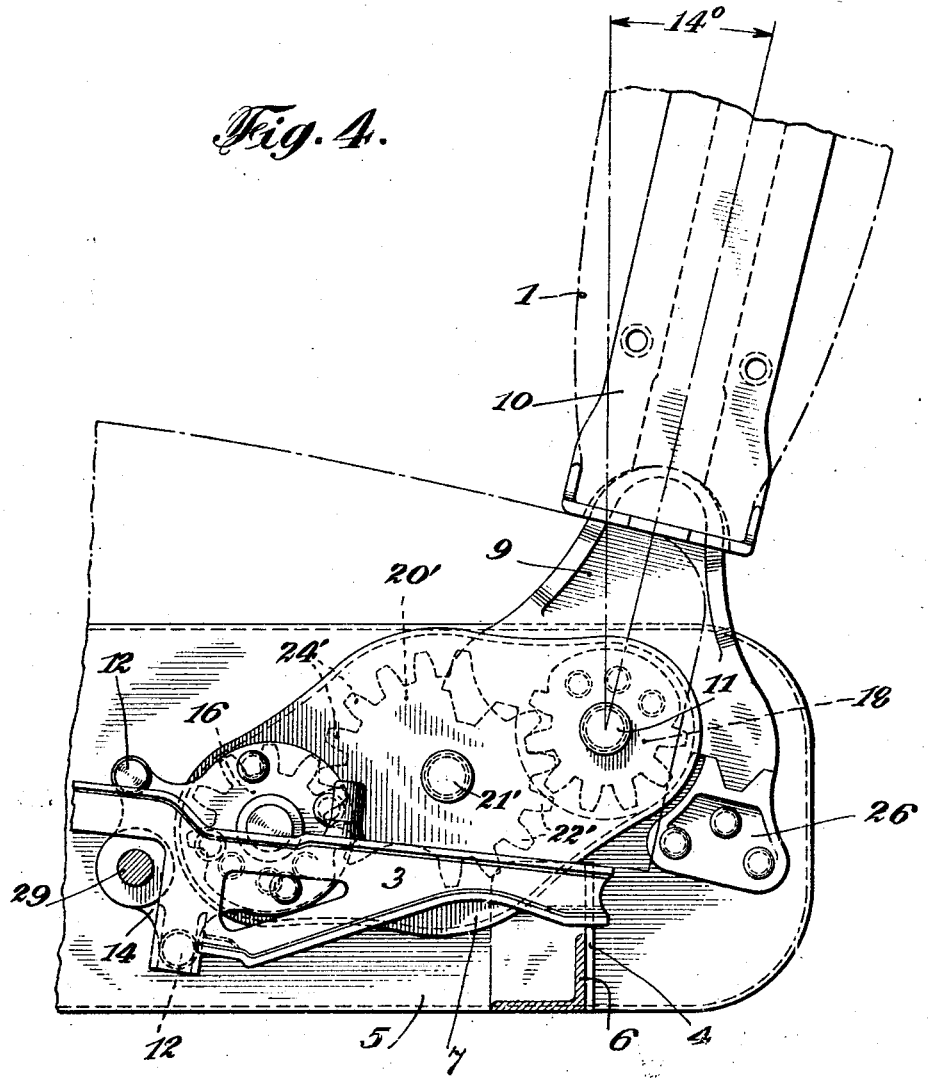

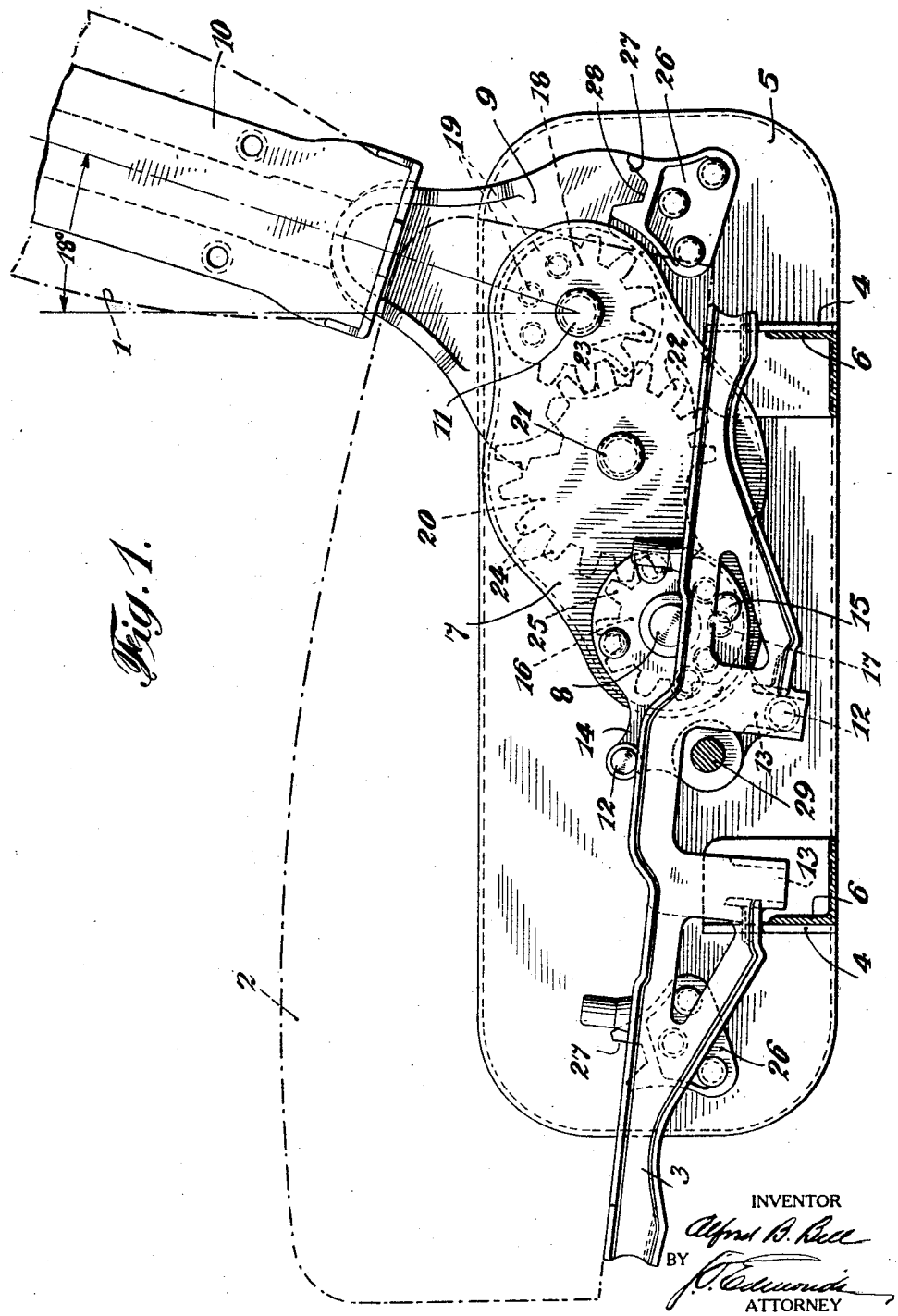

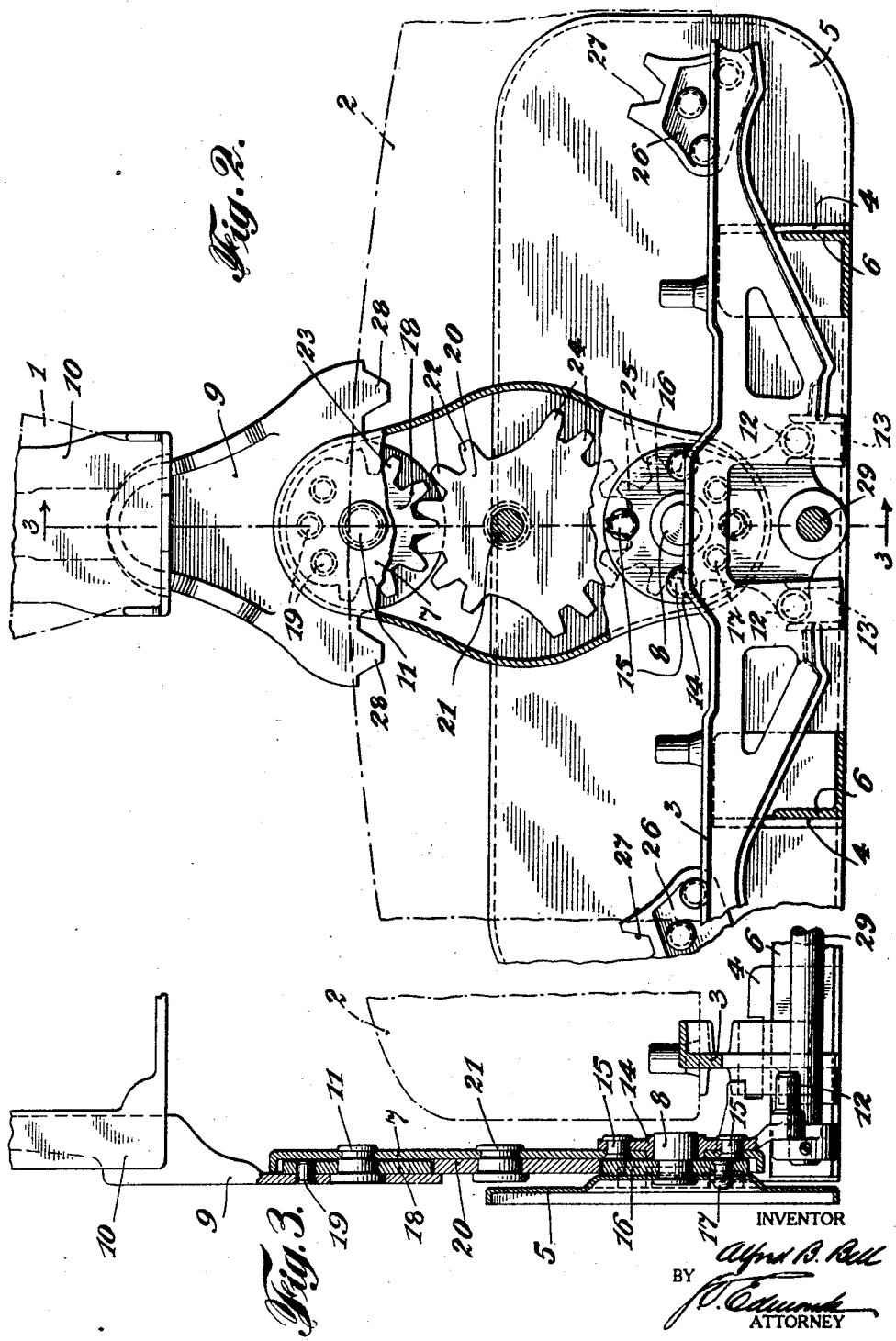

Dec. 8, 1925.

A. B. BELL 1,564,401

CAR SEAT

Filed Nov. 9, 1923    3 Sheets-Sheet 3

INVENTOR
Alfred B. Bell
BY
ATTORNEY

Patented Dec. 8, 1925.

1,564,401

UNITED STATES PATENT OFFICE.

ALFRED B. BELL, OF PHILADELPHIA, PENNSYLVANIA, ASSIGNOR TO THE AMERICAN MOTOR BODY CORPORATION, OF PHILADELPHIA, PENNSYLVANIA, A CORPORATION OF DELAWARE.

CAR SEAT.

Application filed November 9, 1923. Serial No. 673,691.

*To all whom it may concern:*

Be it known that I, ALFRED B. BELL, a citizen of the United States, residing at Philadelphia, in the county of Philadelphia and State of Pennsylvania, have invented certain new and useful Improvements in Car Seats, of which the following is a specification.

This invention relates to car seats and more particularly relates to reversible car seats, or those in which the back is moved from one side of the seat to the other and the seat cushion is shifted simultaneously in the reverse direction.

One of the objects of this invention is to provide a car seat which may be reversed in a very short space. Another object of this invention is to provide a reversible car seat in which there is no gap between the bottom of the back and the rear edge of the seat cushion. Another object of this invention is to provide a reversible car seat in which all the operating parts are at all times above the line of the parts, such as the connecting rails and truss angles, upon which the seat rests at the wall. Another object of our invention is to provide a reversible car seat in which the angle of the back may be changed readily and easily, by making a simple and slight alteration in the construction, while maintaining most of the parts the same and in the same adjustment for all angles of the back. A further object of this invention is to provide a reversible car seat mechanism which affords a maximum of bearing surface, which is positive and smooth in action, and which at the same time is simple, durable and extremely sturdy. Other objects of this invention will be in part obvious and in part pointed out hereinafter.

In accordance with this invention, the seat mechanism includes a throw unit which is pivotally mounted intermediate its ends to an end plate and having its upper end pivoted to a seat standard and at its lower end engaging a seat rocker, and, if desired, a foot rest and connecting rod. The angle of the back is determined by means of a toothed disc or plate eccentrically pivoted on the throw unit, this disc meshing in one direction with a toothed element which is attached rigidly to the seat standard, and said disc meshing in the opposite direction with a toothed element which is rigidly attached to the seat end. The teeth are constantly in mesh. Thus a maximum bearing surface is established. The eccentricity and the diametrical or circular pitch of the rotatable toothed disc, in each of said directions, determines the angle of the back, and this angle can be varied at will by merely changing these components of the toothed disc. It is desirable to provide on the seat end a rest or stop for the back standard, which, however, may require relocation whenever the mechanism is adjusted to vary the pitch of the seat back.

In order that a clearer understanding of my invention may be had, attention is hereby directed to the accompanying drawings, forming a part of this application, and illustrating certain possible embodiments of this invention. Referring to the drawings, Fig. 1 is a sectional side view of a car seat embodying this invention and showing the seat back at one side of the seat; Fig. 2 is similar to Fig. 1, except the seat back is shown at the center of the seat and at the center of its path of movement from one side of the seat to the other side, and a portion is broken away at one end; Fig. 3 is a sectional view of the same and is taken on the line 3—3 of Fig. 2; and Fig. 4 is a sectional side view of a portion of a similar car seat altered to give the back an angle different from the angle shown in Fig. 1. Similar reference characters refer to similar parts throughout the several views of the drawings.

Referring to the drawings, the seat back 1 is shown in dot and dash lines and the seat cushion 2 is also shown in dot and dash lines. The seat supporting and reversing mechanism is preferably identical at both ends of the seat. Accordingly, in the drawings, there is shown one end only of the seat.

As shown, the cushion supporting rocker 3 is shiftably supported on suitable members 4 which are secured to and supported by the seat end 5. Connecting rails 6 are shown in section. To effect seat reversal, a member 7 is pivoted intermediate its ends upon a bearing pin 8 carried on the end plate 5. The upper end of this member is pivotally connected to the lower end 9 of the back standard 10, as by means of bearing pin 11. At the lower end of member 7 lugs 12 or the like cooperate with suitable slots 13 in the seat rocker to effect the shifting of the cushion when the seat is reversed. If desired, the lower portion of the member 7 may constitute a separate member 14 which may be secured in position by means of rivets 15 or the like. About the bearing pin 8 there is also a toothed member 16 which is attached to the end plate 5 against rotation by means of rivets 17 or the like. Another toothed member 18 is positioned about bearing pin 11 and is secured to the lower portion 9 of the back standard and against rotation by means of rivets 19 or the like. Between the toothed members 16 and 18 there is a toothed disc or plate 20 pivotally secured to the member 7 by means of a bearing pin 21. Member 20 is eccentrically mounted and has teeth 22 arranged on one diameter or circular pitch which are constantly in mesh with the teeth 23 of the element 18, and also has teeth 24 arranged on the same or on a different diameter or circular pitch and constantly in mesh with the teeth 25 of the element 16. As the seat back is moved from one side of the seat to the other, teeth 24 of member 20 run over the teeth of stationary member 16, and at the same time the teeth 22 of member 20 and the teeth 23 of member 18 run in mesh. It is not necessary to make a complete revolution of any of the toothed members. The teeth being constantly in mesh establish a maximum of bearing surface. Preferably, suitable stops, such as 26, are attached to the seat end to cooperate in supporting the seat back. These stop members 26 may be provided with V-shaped seats 27 adapted to receive similarly shaped projections 28 provided on the widened end portion 9 of the seat standard. The member 7 is preferably widened, suitably contoured and inwardly flanged at its edges, as at 29, to cover up and inclose the toothed members 16, 18 and 20, preventing a person's clothing or fingers, or other foreign matter, from encountering the teeth.

In order to effect a change in the angle of the seat back, it is only necessary to change the center of the central toothed member 20, with corresponding changes in the diametrical or circular pitch of the portions thereof having the teeth 22 and 24. For instance, in Fig. 1 there is diagrammatically illustrated an arrangement wherein the pivotal point 21 of the member 20 is so located and its toothed portions 22 and 24 are so pitched as to give the back an angle of 18 degrees when in seating position. In Fig. 4 the pivot point 21' of the toothed member 20' is nearer the center of this member, and the pitch of its toothed portion 24' is decreased while the pitch of its toothed portion 22' is increased. Otherwise the parts are identical, but with this change the mechanism gives the seat back an angle of 14 degrees instead of an angle of 18 degrees when in seating position. With the change in the angle of the seat back it is usually necessary to relocate the stop 26 on the end plate.

The shape of the teeth can be varied, a desirable feature, however, being to have a minimum number of teeth with a maximum of bearing surface.

It will be noticed that the total centers from the stationary pivot on the end plate to the pivot 11 on the back standard portion 9 in conjunction with the double throw rocker and lever motion make it possible to reverse the seat in a very short space. With this construction it is possible to bring the bottom of the seat cushion 1 so close to the rear edge of the seat cushion as to entirely or almost entirely close up to the space between them. It will also be noticed that all operating parts are maintained, both while at rest and during the reversal of the seat, entirely above the line of the connecting rails 6. The simplicity, strength and durability of the construction will be obvious.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:

1. In a car seat, the combination with a seat end, a reversible back standard, a shiftable seat rocker, a throw member pivotally connected with said seat end and with said back standard, and a connection between said throw member and said rocker whereby pivotal movement of said throw member on said seat end effects shifting of said rocker, of means establishing and maintaining a bearing engagement between said seat end, said throw member and said back standard, said means comprising stationary teeth carried on said standard, stationary teeth carried on said end plate, and a member pivotally mounted on said throw member and having teeth in mesh with the said stationary teeth on said standard and seat end.

2. In a car seat, the combination with a reversible back standard, a support at the end of the seat, and a connecting member pivotally connected with said support and said back standard, of a stationary first toothed member at said seat end, a second toothed member at said back standard and stationary with respect thereto, and a third toothed member bodily movable with and also rotatable with respect to said connecting member, said third toothed member being in constant mesh with said first and second toothed members, and stops for said standard at each side of the seat.

3. In a car seat, the combination with a reversible back standard, a support at the end of the seat, and a connecting member pivotally connected with said support and said back standard, of a stationary first toothed member at said seat end, a second toothed member at said back standard and stationary with respect thereto, and a third toothed member bodily movable with and also rotatable with respect to said connecting member, said third toothed member being in constant mesh with said first and second toothed members, and stops for said standard at each side of the seats, said third toothed member having teeth arranged in an arc of one diameter in mesh with said first toothed member and having other teeth arranged in an arc of another diameter in mesh with said second toothed member.

4. In a car seat, the combination with a reversible back standard, a support at the end of the seat, and a connecting member pivotally connected with said support and said back standard, of a stationary first toothed member at said seat end, a second toothed member at said back standard and stationary with respect thereto, and a third toothed member bodily movable with and also rotatable with respect to said connecting member, said third toothed member being in constant mesh with said first and second toothed members, and stops for said standard at each side of the seat, said third toothed member having teeth arranged in an arc of one diameter in mesh with said first toothed member and having other teeth arranged in an arc of another diameter in mesh with said second toothed member, the diameter of said arcs and the location of said stops determining the angle of the back standard at the side of the seat.

5. In a car seat, the combination with a reversible back standard, a support at the end of the seat, and a connecting member pivotally connected with said support and said back standard, of a stationary first toothed member at said seat end, a second toothed member at said back standard and stationary with respect thereto, and a third toothed member bodily movable with and also rotatable with respect to said connecting member, said third toothed member being in constant mesh with said first and second toothed members, and stops for said standard at each side of the seat, said connecting member being sufficiently wide and suitably contoured to cover said toothed members.

6. In a car seat, the combination with an end plate, a shiftable rocker, and a reversible back standard, of a throw unit pivotally mounted intermediate its ends to said end plate and having an upper end pivoted to said seat standard and having a lower end engaging said seat rocker, and means for determining the angle of said back standard, said means comprising a toothed plate eccentrically pivoted on said throw unit and meshing in one direction with a toothed element which is rigidly attached to said seat standard, and said plate meshing in the opposite direction with a toothed element rigidly attached to said end plate, and rests for said seat standard at each end of said end plate.

This specification signed this sixth day of November, 1923.

ALFRED B. BELL.